(12) United States Patent
Shelton

(10) Patent No.: US 6,990,712 B2
(45) Date of Patent: Jan. 31, 2006

(54) PIPE JOINING TOOL

(76) Inventor: William C. Shelton, 15514 Old Hancock Rd., Cumberland, MD (US) 21502

( * ) Notice: Subject to any disclaimer, the term of this patent is extended or adjusted under 35 U.S.C. 154(b) by 79 days.

(21) Appl. No.: 10/725,589

(22) Filed: Dec. 3, 2003

(65) Prior Publication Data

US 2005/0120531 A1    Jun. 9, 2005

(51) Int. Cl.
*B23P 19/04*    (2006.01)
(52) U.S. Cl. ............................. 29/237; 29/272; 29/282; 269/37
(58) Field of Classification Search .................. 269/37, 269/38, 43; 29/237, 278, 255, 270, 281.5, 29/281.4, 280, 271–275
See application file for complete search history.

(56) References Cited

U.S. PATENT DOCUMENTS

| 3,653,115 | A | | 4/1972 | Perkins |
| 3,797,094 | A | | 3/1974 | Combs et al. |
| 3,815,202 | A | | 6/1974 | Squires |
| 3,982,739 | A | * | 9/1976 | Maes ............................. 269/37 |
| 3,988,819 | A | * | 11/1976 | Sato ............................. 29/237 |
| 4,722,468 | A | * | 2/1988 | McClure ....................... 228/49.3 |
| 5,052,608 | A | * | 10/1991 | McClure ....................... 228/44.5 |
| 5,165,160 | A | * | 11/1992 | Poncelet ....................... 29/464 |
| 5,226,231 | A | | 7/1993 | De Leebeeck |
| 5,573,229 | A | | 11/1996 | Lycan |
| 5,640,748 | A | | 6/1997 | Harrison |
| 6,167,604 | B1 | | 1/2001 | Del Bono |
| 6,412,157 | B1 | | 7/2002 | Gray |

\* cited by examiner

*Primary Examiner*—Lee D. Wilson
(74) *Attorney, Agent, or Firm*—Stephen R. Greiner

(57) ABSTRACT

A pipe joining tool including a mounting bracket for releasable attachment to a pipe. The mounting bracket has a U-shaped platform with an intermediate portion for engaging a pipe and a pair of slotted end portions extending from the opposite ends of the intermediate portion in a substantially parallel manner. A wedge slidably extends through the slots in the end portions for driving a pipe positioned within the U-shaped platform into tight engagement with the intermediate portion. A flexible link is secured to the mounting bracket and extends therefrom. A pipe fitting keeper is carried by the flexible link for releasably grasping a pipe fitting and suspending the pipe fitting adjacent the end of a pipe positioned within the U-shaped platform. A pair of spaced apart legs projects forwardly from the intermediate portion of the U-shaped platform. Each of the spaced apart legs has an internally threaded bore within which is positioned a bolt. Selective rotation of each bolt moves the pipe fitting suspended by the pipe fitting keeper into alignment with the end of a pipe positioned within the U-shaped platform.

12 Claims, 2 Drawing Sheets

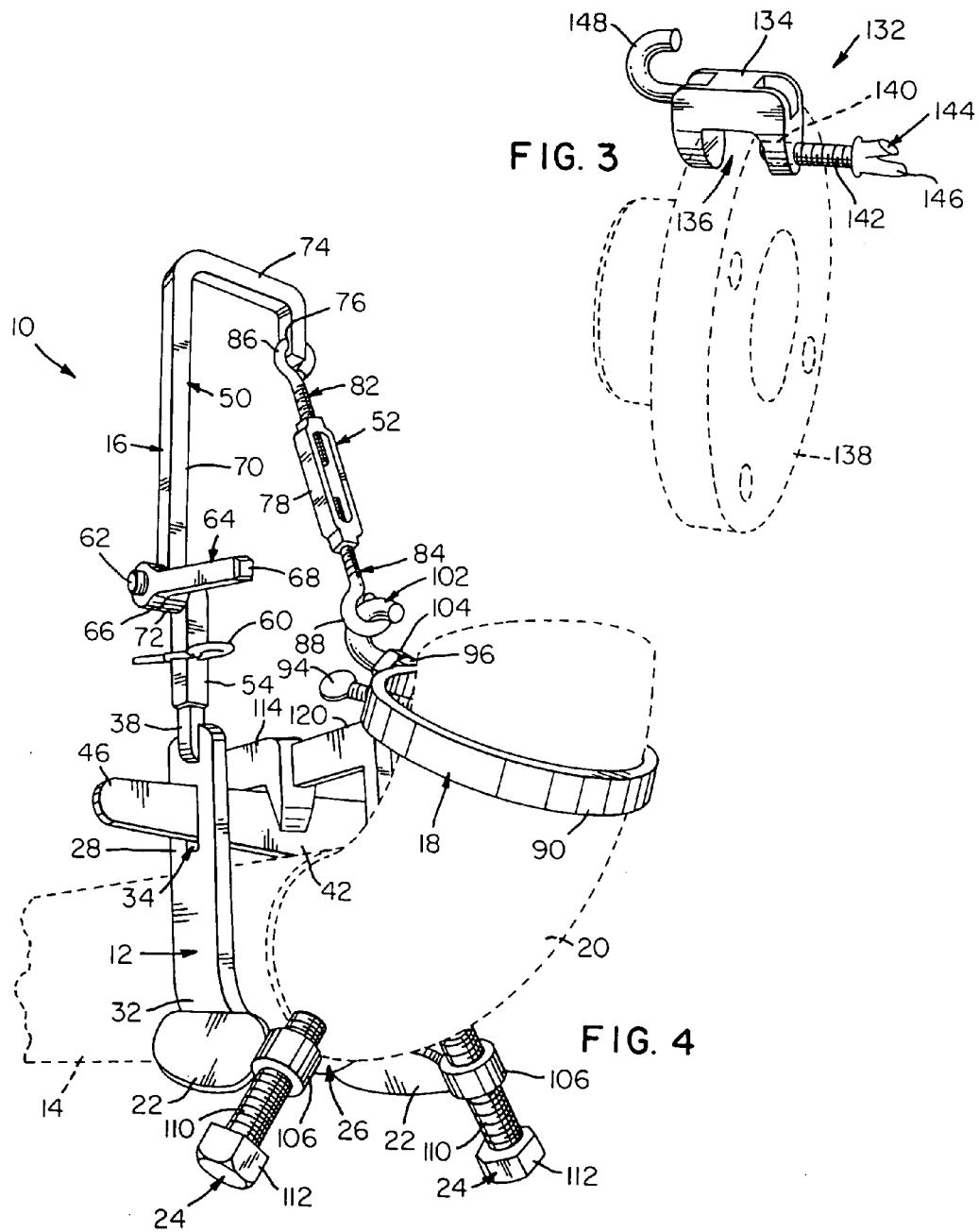

PIPE JOINING TOOL

FIELD OF THE INVENTION

The present invention relates generally to metal working apparatus and, more particularly, to means for assembling or disassembling.

BACKGROUND OF THE INVENTION

Welding fittings onto pipe is a difficult undertaking, often requiring a pair of men to perform satisfactorily. It is not unusual for one man to orient, align and support fittings, such as tees, ells and flanges, against the pipe ends while the other man welds them together. This is hazardous work where burns, bruises, strains and broken bones are not uncommon. Of course, the work is costly because the men performing it must be highly skilled and well-paid.

Additionally, both of these men must be covered by expensive insurance to offer them some protection in the event of an accident.

SUMMARY OF THE INVENTION

In light of the problems associated with the known methods and apparatus for welding pipe fittings onto pipe, it is a principal object of the invention to provide the tool that permits one man, working alone, to quickly and easily position a pipe fitting in a selected orientation against one end of a piece of pipe and weld the fitting into place. Such a tool reduces costs to users by limiting the manpower required to perform a selected task. As an ancillary benefit, reducing the number of men involved in welding also reduces the likelihood of an accident occurring and lowers insurance premiums.

It is a further object of the present invention to provide a tool of the type described that can be readily disassembled or collapsed for trouble-free transport and storage after use.

It is another object of the present invention to provide a tool of the type described that requires minimal training to employ. The tool is intuitive to use in orienting, aligning and supporting all sorts of pipe and fittings.

It is another object of the present invention to provide a pipe joining tool that can be used with pipe and fittings made from a variety of materials, such as steel or aluminum, in a variety of sizes and diameters. By scaling the functional features of the tool up or down, the tool could readily handle pipe and fittings having nominal diameters ranging from about two inches to ten inches.

Still another object of the invention is to provide a pipe joining tool that not only permits fittings to be welded to a piece of pipe but also permits two fittings to be aligned and welded to one another or two pieces of pipe to be aligned and welded together.

It is an object of the invention to provide improved elements and arrangements thereof in a pipe joining tool for the purposes described that is lightweight in construction, inexpensive to manufacture, and fully dependable in use.

Briefly, the pipe joining tool in accordance with this invention achieves the intended objects by featuring a mounting bracket for releasable attachment to a pipe. The mounting bracket has a U-shaped platform and a wedge that extends through slots in the platform to lock the platform onto the pipe. A flexible link is secured to the mounting bracket and carries a pipe fitting keeper at its free end. The keeper is adapted to grasp a pipe fitting and suspend such adjacent the end of the pipe to which the mounting bracket is locked. A pair of spaced apart legs projects forwardly from the platform. Each of the legs has an internally threaded bore within which is positioned a bolt for engagement with a pipe fitting in the keeper. Selective rotation of each bolt moves the pipe fitting into alignment with the end of a pipe to which the mounting bracket is locked.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 3 is a perspective view of a pipe fitting keeper that can be optionally employed in the pipe joining tool.

FIG. 4 is a perspective view of the pipe joining tool in use.

Similar reference characters denote corresponding features consistently throughout the accompanying drawings.

DETAILED DESCRIPTION OF THE PREFERRED EMBODIMENT

Figures 1, 2:
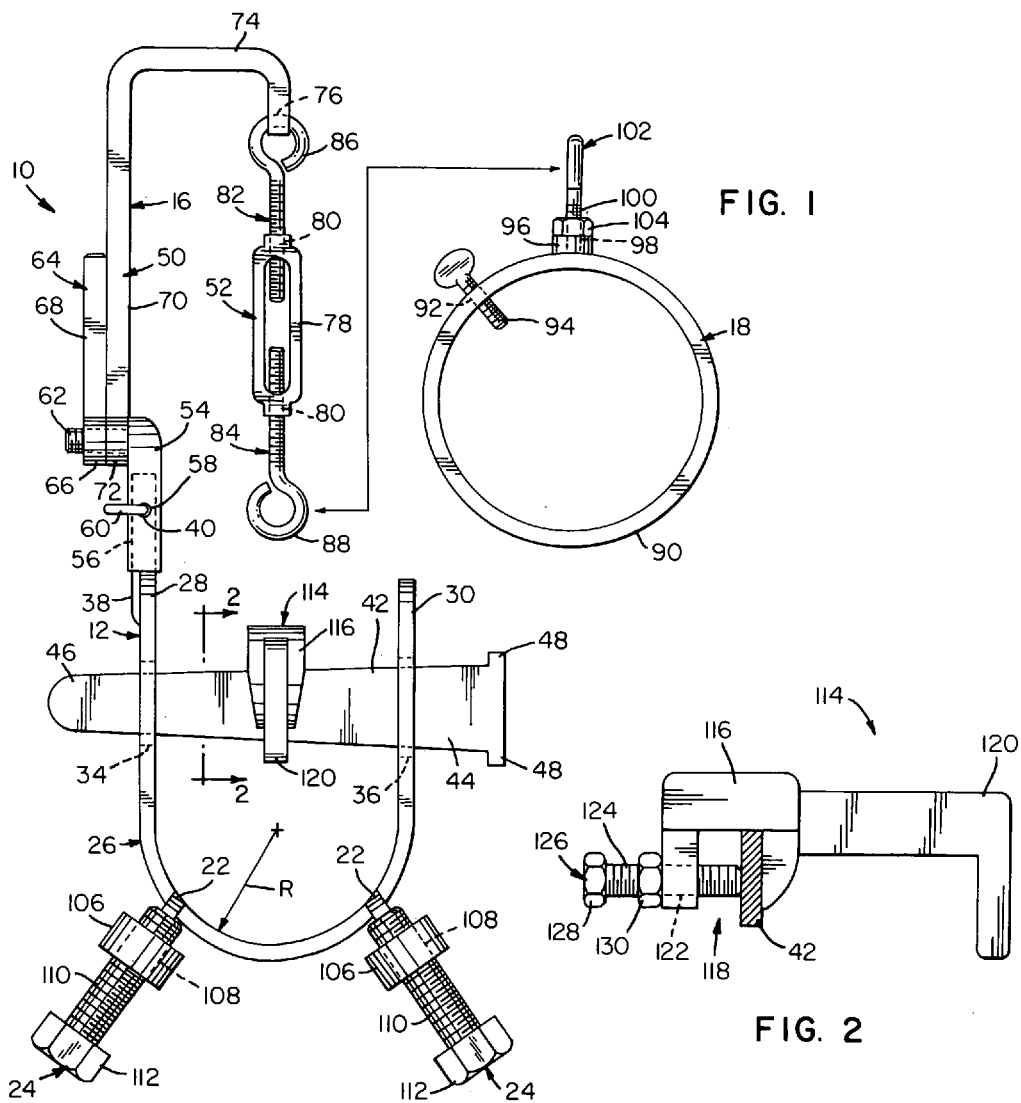
FIG. 1 is a front elevational view of a pipe joining tool in accordance with the present invention.
FIG. 2 is a cross-sectional view taken along line 2—2 of FIG. 1.

Referring now to the FIGS., a pipe joining tool in accordance with the present invention is shown at 10. Tool 10 includes a mounting bracket 12 adapted for releasable attachment to one end of a pipe 14. A flexible link 16 is secured to mounting bracket 12. Carried at the free end of flexible link 16 is a pipe fitting keeper 18 for releasably grasping a pipe fitting, such as ell 20, and suspending pipe fitting 20 adjacent the end of pipe 14. A pair of legs 22 projects from the bottom of mounting bracket 12 and carries a pair of bolts 24 that can help position pipe fitting 20 suspended by keeper 18 in alignment with pipe 14 so that pipe 14 and pipe fitting 20 can be welded together.

Mounting bracket 12 includes a U-shaped platform 26 having a pair of linear end portions 28 and 30 joined together by an arcuate intermediate portion 32. As shown, intermediate portion 32 is provided with a radius of curvature R that closely matches the external radius of pipe 14. End portions 28 and 30, on the other hand, are provided with lengths that are about two times that of radius R and are disposed parallel to one another.

End portions 28 and 30 are provided with opposed slots 34 and 36 positioned midway along their respective lengths. Slots 34 and 36 extend along the longitudinal axes of end portions 28 and 30 and are of even width along their lengths. Slot 34, however, is somewhat shorter than slot 36.

A retaining finger 38 is affixed to the free end of end portion 28 remote from intermediate portion 32. Retaining finger 38 extends from end portion 28 substantially along the longitudinal axis of end portion 28. Retaining finger 38 has a square cross-section and is provided with a transverse aperture 40 that extends from the front to the back thereof.

A wedge 42 slidably extends through slots 34 and 36 in U-shaped platform 26. Preferably, wedge 42 is a stiff plate having a length that is about four times radius R. Wedge 42 has a width that is slightly less than that of slots 34 and 36 and a height that tapers evenly from a tall, outer end 44 to a short, inner end 46. A pair of flanges 48 extends upwardly and downwardly from the top and bottom of wedge 42 at outer end 44. Flanges 48 provide wedge 42 with a height that is greater than that of slot 36 so as to prevent wedge 42 from passing fully through slot 36 when wedge 42 is fully inserted therein.

Flexible link 16 includes a retaining arm 50 that carries a turnbuckle 52 at its outer end and is secured by a tubular sleeve 54 to retaining finger 38 at its inner end. Tubular sleeve 54 has a longitudinal socket 56 of square cross-section adapted to snugly receive retaining finger 38 therein. A transverse bore 58 is provided near the midpoint of sleeve 54 and is adapted for axial alignment with transverse aperture 40 in retaining finger 38. A pin 60 run through aperture 40 and bore 58 firmly, yet releasably, connects tubular sleeve 54 to retaining finger 38.

A threaded stud 62 is affixed to tubular sleeve 54 and extends laterally therefrom. A threaded fastener 64 is threadably secured to stud 62. Fastener 64 includes a nut 66 for encircling stud 62 and a lever 68 extending outwardly from nut 66. By applying a light sideways force to the free end of lever 68, considerable torque can be applied to nut 66 to drive such along stud 62.

Retaining arm 50 is J-shaped and includes a shank portion 70 having a length that is about three and one half times radius R. Shank portion 70 has an eye 72 at one of its ends for snugly receiving stud 62 between sleeve 54 and nut 66. Retaining arm 50 also includes a hook portion 74 at the end thereof that is remote from eye 72. Hook portion 74 is sized so that the free end thereof is adjustably positioned on a plane bisecting U-shaped platform 26 midway between end portions 28 and 30. A hole 76 passes through the free end of hook portion 74.

Turnbuckle 52 includes an elongated loop 78 with threaded bores 80 at its opposite ends. The inner ends of a pair of threaded rods 82 and 84 are threadably engaged with bores 80. The outer ends of rods 82 and 84, however, are formed into circles 86 and 88. As shown, circle 86 extends through hole 76 in hook portion 74 to secure turnbuckle 52 to retaining arm 50. By rotating loop 52 while holding rods 82 and 84 steady, the effective length of turnbuckle 52 can be selectively increased or decreased.

Pipe fitting keeper 18 includes a ring 90 having a radius of curvature that is substantially the same as that provided to intermediate portion 32 of platform 26. A threaded bore 92 is provided in ring 90 for threadably receiving a thumbscrew 94 whose longitudinal axis passes through the center of ring 90. Adjacent bore 92, a socket member 96 is affixed to the exterior of ring 90. Socket member 96 is provided with a threaded bore 98 for threadably receiving the threaded shank 100 of a retaining hook 102 that can be suspended from circle 88 of turnbuckle 52. A jam nut 104 is fitted upon threaded shank 100 adjacent socket member 96 so as to permit a user of tool 10 to fix the orientation of retaining hook 102 relative to ring 90.

Legs 22 are affixed to the bottom of platform 26. Legs 22 are positioned in a spaced apart relationship on opposite sides of intermediate portion 32. Further, legs 22 project forwardly from intermediate portion 32 and carry enlarged feet 106 at their free ends. Each of the feet 106 is provided with an internally threaded bore 108 whose longitudinal axis intersects an imaginary plane that bisects platform 26 at the approximate height of slots 34 and 36. Within each bore 108 is threadably positioned the threaded shaft 110 of a bolt 24 having a length sufficient to extend above the bottom of intermediate portion 32 should a user so desire. The head 112 of the each bolt 24 is located beneath its associated foot 106 and may be grasped and turned by a wrench or the hand of a user (neither shown).

A pipe fitting guide 114 can be releasably clamped upon wedge 42. Guide 114 has a carriage block 116 with a lateral slot 118 for receiving the top of wedge 42 therein and an L-shaped stay 120 that extends forwardly and downwardly from the front of block 116. A threaded bore 122 penetrates the back of block 116 and provides access to lateral slot 118. The threaded shaft 124 of a bolt 126 is threadably engaged with bore 122. By rotating head 128 of bolt 126, shaft 124 can be driven into tight engagement with wedge 42 so as to clamp wedge 42 within slot 118. A jam nut 130 positioned on shaft 124 outside of slot 118 permits a user to lock bolt 126 in engagement with wedge 42 simply by driving nut 130 against the back of block 116.

An alternative pipe fitting keeper 132 is illustrated in FIG. 3. Pipe fitting keeper 132 has a base block 134 with a lateral slot 136 for receiving the top of a pipe fitting such as pipe flange 138. A threaded bore 140 penetrates the front of block 134 and provides access to lateral slot 136. The threaded shaft 142 of a thumbscrew 144 is threadably engaged with bore 140. By rotating the head 146 of thumbscrew 144, shaft 142 can be driven into tight engagement with a pipe fitting like flange 138 to clamp flange 138 within slot 136. A hook 148 extends from the back of block 134 to which such is pivotally fastened. Like hook 102 of keeper 18, hook 148 is adapted to be suspended from circle 88 of turnbuckle 52.

The use of tool 10 in joining pipe fitting 22 pipe 14 is straightforward. First, platform 26 is engaged with pipe 14 by placing pipe 14 between end portions 28 and 30 and against intermediate portion 32. Then, wedge 42 is positioned within slots 34 and 36 and is pressed firmly into engagement with pipe 14 by lightly striking end 44 of wedge 42 with a hammer (not shown) to compress wedge 42 between the top of slots 34 and 36 and pipe 14. Next, fitting 20 is locked within ring 90 of keeper 18 by turning thumbscrew 94 into tight engagement with fitting 20. After extending retaining hook 102 through circle 88 of turnbuckle 52, one end of fitting 20 is positioned against an end of pipe 14 and retaining arm 50 is rotated to a position capable of retaining fitting 20 in the desired location. Now, threaded fastener 64 is turned on stud 62 to lock arm 50 in place. If desired, guide 114 can be clamped atop wedge 42 to ensure that pipe fitting 20 will not become disengaged from tool 10. Finally, by rotating bolts 24 and loop 78 of turnbuckle 52, pipe fitting 20 is brought into perfect alignment with the end of pipe 14. Welding of pipe fitting 22 to pipe 14 can now take place. The entire process of positioning pipe fitting 20 against pipe 14 requires only one man and a few minutes to complete and can be accomplished in complete safety.

Should it be desired that flange 138 be welded to pipe 14 instead of pipe fitting 20, pipe fitting keeper 132 would be employed instead of pipe fitting keeper 18. The process for accomplishing the overall task would be substantially the same as that outlined above except that hook 148 of keeper 132 would be engaged with circle 88 of turnbuckle 52 instead of hook 102 of keeper 18. Again, the process can be performed solo and with great ease.

While the invention has been described with a high degree of particularity, it will be appreciated by those skilled in the art that modifications may be made thereto. Therefore, it is to be understood that the present invention is not limited to the sole embodiment described above, but encompasses any and all embodiments within the scope of the following claims.

I claim:

1. A pipe joining tool, comprising:
   a mounting bracket for releasable attachment to a pipe, said mounting bracket including:

a U-shaped platform having an intermediate portion for engaging a pipe and a pair of end portions extending from the opposite ends of said intermediate portion in a substantially parallel manner, each of said end portions being provided with a slot; and, a wedge slidably extending through said slot in each of said end portions for driving a pipe positioned within said U-shaped platform into tight engagement with said intermediate portion;

a flexible link being secured to said mounting bracket and extending therefrom;

a pipe fitting keeper being carried by said flexible link for releasably grasping a pipe fitting and suspending the pipe fitting adjacent the end of a pipe positioned within said U-shaped platform;

a pair of spaced apart legs projecting forwardly from said intermediate portion of said U-shaped platform, each of said spaced apart legs having an internally threaded bore; and, a pair of bolts each of which being threadably engaged with said internally threaded bore of a respective one of said spaced apart legs such that selective rotation of said bolts moves a pipe fitting suspended by said pipe fitting keeper into perfect alignment with the end of a pipe positioned within said U-shaped platform.

2. The pipe joining tool according to claim 1 wherein said flexible link includes:
   a retaining arm being pivotally fastened to one of said end portions of said U-shaped platform; and,
   a turnbuckle being suspended from the free end of said retaining arm and carrying said pipe fitting keeper.

3. The pipe joining tool according to claim 2 wherein said mounting bracket includes a retaining finger extending from one of said end portions of said U-shaped platform, said retaining finger having a transverse aperture, and said flexible link includes a tubular sleeve being pivotally secured to said retaining arm, said tubular sleeve having a longitudinal socket for snugly receiving said retaining finger therein, said tubular sleeve having a transverse bore adapted for axial alignment with said transverse aperture, and said flexible link further including a pin for extension through said transverse aperture and said transverse bore for locking said flexible link to said U-shaped platform.

4. The pipe joining tool according to claim 1 wherein said pipe fitting keeper includes:
   a ring for receiving a tubular portion of a pipe fitting therein;
   a thumbscrew being threadably engaged with said ring for selectively engaging the tubular portion of a pipe fitting positioned within said ring and securing said pipe fitting to said ring; and,
   a retaining hook being secured to said ring for suspending said ring from said turnbuckle.

5. The pipe joining tool according to claim 1 wherein said pipe fitting keeper includes:
   a base block having a lateral slot for receiving a portion of a pipe fitting;
   a thumbscrew being threadably engaged with said base block and penetrating said lateral slot for engaging the portion of a pipe fitting positioned within said lateral slot and securing said pipe fitting to said block; and,
   a retaining hook being secured to said block forces spending said block from said turnbuckle.

6. The pipe joining tool according to claim 1 further comprising a pipe fitting guide releasably clamped upon said wedge for pressing a pipe fitting into engagement with said pair of bolts.

7. A pipe joining tool, comprising:
   a mounting bracket for releasable attachment to a pipe;
   a flexible link being secured to said mounting bracket and extending therefrom, said flexible link including:
      a retaining arm being pivotally fastened to said mounting bracket; and,
      a turnbuckle being suspended from the free end of said retaining arm;
   a pipe fitting keeper being suspended from said turnbuckle for releasably grasping a pipe fitting and suspending the pipe fitting adjacent the end of a pipe positioned within said mounting bracket;
   a pair of spaced apart legs projecting forwardly from said mounting bracket, each of said spaced apart legs having an internally threaded bore; and,
   a pair of bolts, each of which being threadably engaged with said internally threaded bore of a respective one of said spaced apart legs such that selective rotation of said bolts moves a pipe fitting suspended by said pipe fitting keeper into alignment with the end of a pipe positioned within said mounting bracket.

8. The pipe joining tool according to claim 7 wherein said mounting bracket includes a retaining finger having a transverse aperture, and said flexible link includes a tubular sleeve being pivotally secured to said retaining arm, said tubular sleeve having a longitudinal socket for receiving said retaining finger, said tubular sleeve also having a transverse bore adapted for axial alignment with said transverse aperture, and said flexible link further including a pin for extension through said transverse aperture and said transverse bore for locking said flexible link to said mounting bracket.

9. The pipe joining tool according to claim 7 wherein said pipe fitting keeper includes:
   a ring for receiving a tubular portion of a pipe fitting therein;
   a thumbscrew being threadably engaged with said ring for selectively engaging the tubular portion of a pipe fitting positioned within said ring and securing said pipe fitting to said ring; and,
   a retaining hook being secured to said ring for suspending said ring from said turnbuckle.

10. The pipe joining tool according to claim 7 wherein said pipe fitting keeper includes:
    a base block having a lateral slot for receiving a portion of a pipe fitting;
    a thumbscrew being threadably engaged with said base block and penetrating said lateral slot for engaging the portion of a pipe fitting positioned within said lateral slot and securing said pipe fitting to said block; and,
    a retaining hook being secured to said block forces spending said block from said turnbuckle.

11. The pipe joining tool according to claim 7 further comprising a pipe fitting guide releasably clamped upon said wedge for pressing a pipe fitting into engagement with said pair of bolts.

12. A pipe joining tool, comprising:
    a mounting bracket for releasable attachment to a pipe, said mounting bracket including:
       a U-shaped platform having an intermediate portion for engaging a pipe and a pair of end portions extending from the opposite ends of said intermediate portion in a substantially parallel manner, each of said end portions being provided with a slot;

a retaining finger extending from one of said end portions; and,
a wedge slidably extending through said slot in each of said end portions for driving a pipe positioned within said U-shaped platform into tight engagement with said intermediate portion;
a flexible link being secured to said mounting bracket and extending therefrom, said flexible link including:
a tubular sleeve releasably secured upon said retaining finger;
a retaining arm being pivotally fastened to said tubular sleeve; and,
a turnbuckle being suspended from the free end of said retaining arm;
a pipe fitting keeper being carried by said turnbuckle for releasably grasping a pipe fitting and suspending the pipe fitting adjacent the end of a pipe positioned within said U-shaped platform;
a pair of spaced apart legs projecting forwardly from said intermediate portion of said U-shaped platform, each of said spaced apart legs having an internally threaded bore; and,
a pair of bolts each of which being threadably engaged with said internally threaded bore of a respective one of said spaced apart legs such that selective rotation of said bolts moves a pipe fitting suspended by said pipe fitting keeper into perfect alignment with the end of a pipe positioned within said U-shaped platform.

* * * * *